(12) United States Patent
Emori et al.

(10) Patent No.: US 8,494,847 B2
(45) Date of Patent: Jul. 23, 2013

(54) WEIGHTING FACTOR LEARNING SYSTEM AND AUDIO RECOGNITION SYSTEM

(75) Inventors: Tadashi Emori, Tokyo (JP); Yoshifumi Onishi, Tokyo (JP)

(73) Assignee: NEC Corporation, Tokyo (JP)

( * ) Notice: Subject to any disclaimer, the term of this patent is extended or adjusted under 35 U.S.C. 154(b) by 989 days.

(21) Appl. No.: 12/528,864

(22) PCT Filed: Feb. 19, 2008

(86) PCT No.: PCT/JP2008/052721
§ 371 (c)(1),
(2), (4) Date: Aug. 27, 2009

(87) PCT Pub. No.: WO2008/105263
PCT Pub. Date: Sep. 4, 2008

(65) Prior Publication Data
US 2010/0094629 A1   Apr. 15, 2010

(30) Foreign Application Priority Data

Feb. 28, 2007   (JP) .................................. 2007-049975

(51) Int. Cl.
*G10L 15/00* (2006.01)
(52) U.S. Cl.
USPC ............ 704/231; 704/234; 704/236; 704/237
(58) Field of Classification Search
USPC .................. 704/231, 234, 236, 237
See application file for complete search history.

(56) References Cited

U.S. PATENT DOCUMENTS

| | | | | |
|---|---|---|---|---|
| 5,710,866 | A * | 1/1998 | Alleva et al. ............... | 704/256.4 |
| 5,819,220 | A * | 10/1998 | Sarukkai et al. ........... | 704/270.1 |
| 6,490,555 | B1 * | 12/2002 | Yegnanarayanan et al. .. | 704/231 |
| 6,671,669 | B1 * | 12/2003 | Garudadri et al. ............ | 704/255 |
| 2002/0111806 | A1 * | 8/2002 | Franz et al. .................... | 704/255 |
| 2002/0116191 | A1 * | 8/2002 | Olsen et al. ................... | 704/251 |
| 2005/0080611 | A1 * | 4/2005 | Huang et al. ..................... | 704/4 |

(Continued)

FOREIGN PATENT DOCUMENTS

| | | |
|---|---|---|
| EP | 1647970 A1 | 4/2006 |
| JP | 07-152394 A | 6/1995 |

(Continued)

OTHER PUBLICATIONS

Soong et al. "Optimal Acoustic and Language Model Weights for Minimizing Word Verification Errors", Proc. ICSLP 2004.*

(Continued)

*Primary Examiner* — Jialong He

(57) ABSTRACT

A weighting factor learning system includes an audio recognition section that recognizes learning audio data and outputting the recognition result; a weighting factor updating section that updates a weighting factor applied to a score obtained from an acoustic model and a language model so that the difference between a correct-answer score calculated with the use of a correct-answer text of the learning audio data and a score of the recognition result becomes large; a convergence determination section that determines, with the use of the score after updating, whether to return to the weighting factor updating section to update the weighting factor again; and a weighting factor convergence determination section that determines, with the use of the score after updating, whether to return to the audio recognition section to perform the process again and update the weighting factor using the weighting factor updating section.

21 Claims, 5 Drawing Sheets

U.S. PATENT DOCUMENTS

| | | | |
|---|---|---|---|
| 2007/0271088 A1* | 11/2007 | Waibel et al. | 704/9 |
| 2008/0004877 A1* | 1/2008 | Tian | 704/251 |
| 2008/0154600 A1* | 6/2008 | Tian et al. | 704/251 |

FOREIGN PATENT DOCUMENTS

| | | |
|---|---|---|
| JP | 09-81182 A | 3/1997 |
| JP | 09-258786 A | 10/1997 |
| JP | 09-274498 A | 10/1997 |
| JP | 11-85186 A | 3/1999 |
| JP | 2000-352993 A | 12/2000 |
| JP | 2002-278578 A | 9/2002 |
| JP | 2004-333738 A | 11/2004 |
| JP | 2006-113570 A | 4/2006 |
| JP | 2007-17548 A | 1/2007 |

OTHER PUBLICATIONS

Ogawa et al. "Balancing Acoustic and Linguistic Probabilities", IEEE, ICASSP 1998.*

Huang et al. "Unified Stochastic Engine (USE) for Speech Recognition", IEEE, ICASSP 1993.*

International Search Report for PCT/JP2008/052721 mailed Jun. 3, 2008.

S. Young, et al., "The HTK Book for HTK version 3.3," Cambridge University Engineering Department, Apr. 2005, pp. 35-40, 54-64, 93, 127-130, 192.

F.J. Och, et al., "Discriminative Training and Maximum Entropy Models for Statistical Machine Translation," Proc. ACL, Jul. 2002, pp. 295-302.

Kita, "Language model and calculation 4: Probabilistic language model.", University of Tokyo Press, 1999.

Lafferty, et al., "Conditional Random Fields: Probabilistic Models for Segmenting and Labeling Sequence Data." In Proc. of ICML, pp. 282-289, 2001.

European search report for EP08711545.7 dated Dec. 18, 2012.

Brian Roark et al: "Discriminative language modeling with conditional random fields and the perceptron algorithm", Proceedings of the 42nd Annual Meeting on Association for Computational Linguistics, ACL '84, Jan. 1, 2004 (2004-81-01), pp. 47-es.

Brian Roark et al., "Discriminative Language Modeling with Conditional Random Fields and the Perception Algorithm", Proceeding of the 42nd Annual Meeting of the Association for Computational Linguistics (ACL-04), Jul. 2004, retrieved from website <http://aclweb.org/anthology-new/P/P04/P04-1007.pdf>,English Publication, Cited in JP Office Action.

Japanese Office Action for JP2009-501184 mailed on Feb. 19, 2013.

* cited by examiner

WORD GRAPH                    TIME INSTANT

| NODE | TIME INSTANT |
|------|--------------|
| I0 = | 1.0 SEC. |
| I1 = | 2.0 SEC. |
| I2 = | 2.5 SEC. |
| I3 = | 3.0 SEC. |
| I4 = | 3.5 SEC. |
| I5 = | 4.0 SEC. |

| STARTING POINT | END POINT | WORD | ACOUSTIC LIKELIHOOD |
|----------------|-----------|------|---------------------|
| I0 | I1 | a | −10.0 |
| I0 | I2 | b | −12.7 |
| I1 | I3 | c | −15.1 |
| I1 | I4 | d | −20.4 |
| I2 | I4 | h | −18.5 |
| I3 | I4 | f | −13.6 |
| I3 | I5 | e | −16.0 |
| I4 | I5 | g | −10.2 |

WEIGHTING FACTOR LEARNING SYSTEM AND AUDIO RECOGNITION SYSTEM

TECHNICAL FIELD

The present invention relates to a weighting factor learning system that learns a weighting factor of a score obtained from an acoustic model and a language model which are used in audio recognition, an audio recognition system that carries out audio recognition using the learned weighting factor, and a method and program for the weighting factor learning system and the audio recognition system.

BACKGROUND ART

Large vocabulary continuous speech recognition is realized with the use of the acoustic model and the language model. The acoustic model is used to calculate a score (referred to as an "acoustic score," hereinafter) representing a degree to which a speech sound acoustically resembles the utterance of a word. The language model is used to calculate a score (referred to as a "language score," hereinafter) representing a degree to which words are easily linked to each other. Ideally, the ratio of the acoustic score to the language score is 1:1.

However, as described on page 93 of Non-Patent Document 1, a value obtained by the acoustic model is approximated by the probability density distribution like normal distribution, and the resultant value is used to approximate. Moreover, as described on page 192 of Non-Patent Document 1, the language model is approximated by N-gram with a preceding N−1 word being used as a condition.

In that manner, both the acoustic model and the language model use the approximated models. Therefore, each score is multiplied by a weighting factor to ensure consistency in bias between the acoustic score and the language score. Here, the bias means a phenomenon of an approximated value becoming larger than an original value. In the field of audio recognition, several values are prepared in advance as weighting factors, and are selected while the recognition rate of test audio data is observed. According to such a method, it is considered that there is no problem if there is one pair of the acoustic model and the language model. However, if there is a plurality of pairs of the acoustic model and the language model or if new scores are combined, the number of parameters that should be prepared increases at an exponential order. Therefore, it is considered impossible to calculate.

For such problems, as described in Non-Patent Document 2, in the field of statistical machine translation, there is a widely known method according to which the weighting factors are adjusted by the maximum entropy method (referred to as "ME method," hereinafter) with respect to the score obtained from a different probabilistic model.

As described on pages 155 to 174 of Non-Patent Document 3, the ME method is to maximize entropy under constraint conditions, and is a learning scheme to estimate a uniform distribution function with respect to unknown data. According to the scheme, it is known that if the maximum likelihood estimation is used as a constraint condition, the estimated distribution function is a logistic function as shown in the following equation (1):

Equation (1)

$$P(w \mid o) = \frac{\exp\left\{\sum_k \lambda_k f_k(w, o)\right\}}{\sum_w \exp\left\{\sum_k \lambda_k f_k(w, o)\right\}} \quad [\text{Math. 1}]$$

where k is a natural number representing the number of models (number); w and o are an output sequence and an input sequence, respectively. In the case of Non-Patent Document 2, w and o are a sequence of English words and a sequence of French words, respectively. $f_k(w, o)$ is a score calculated by each model. In the case of Non-Patent Document 2, $f_1(w, o)$ is the logarithm of the generation probability that an English word appears from a French word; $f_2(w, o)$ is the logarithm of the probability that a sequence of English words appears. $\lambda_k$ represents a weighting factor of a score calculated by each probabilistic model, and is optimized so that with a combination of the correct-answer w and o, the posterior probability P(w|o) has the largest value.

Here, the denominator of the equation (1) means that all the combinations of the output sequences w are added up. However, if the number of elements constituting the output sequences w increases (in the case of Non-Patent Document 2, the number of different English words), the number of combinations increases, making it impossible to calculate the denominator of the equation (1). In the field of statistical machine translation like the one described in Non-Patent Document 2, some approaches, including the following one, are taken to address the above problem: information about words that do not consecutively appear is used as prior knowledge to narrow the number of combinations of word sequences down to a finite number.

Non-Patent Document 1: S. Young and 10 others, "The HTK Book for HTK version 3.3," Cambridge University Engineering Department, April 2005, pp. 1-345

Non-Patent Document 2: F. J. Och and one other, "Discriminative Training and Maximum Entropy Models for Statistical Machine Translation," Proc. ACL, July 2002, pp. 295-302

Non-Patent Document 3: Kita, "Language model and calculation 4: Probabilistic language model," University of Tokyo Press, 1999

Non-Patent Document 4: Lafferty and two others, "Conditional Random Fields: Probabilistic Models for Segmenting and Labeling Sequence Data," In Proc. Of ICML, pp. 282-289, 2001

SUMMARY OF INVENTION

Technical Problem

In the case where the ME method is applied to large vocabulary continuous speech recognition, if all combinations of words are calculated for the calculation of the denominator of the equation (1), every word can appear anywhere in an uttered segment because of a large vocabulary and the continuous amount of observation time sequences of speech sounds corresponding to the input sequence o. Accordingly, even if the same words appear at slightly different times, the scores are different and the words are handled as a combination of different words. Therefore, the number of combinations is enormous. Moreover, if an enormous number of candidates is narrowed down in a simple manner, the estimation of the weighting factor $\lambda_k$ depends on a narrowed environment (method). Therefore, the estimated weighting factor $\lambda_k$ may not reach the desired weighting factor $\lambda_k$.

The objective of the present invention is to provide a system which can automatically estimate a weighting factor applied to a score calculated by an acoustic model and a language model at high speed without prior knowledge about a range and which can carry out audio recognition in a highly accurate manner with the user of the weighting factor.

Solution to Problem

To achieve the above objective, according to the present invention, a weighting factor learning system includes: an audio recognition section that recognizes learning audio data and outputting the recognition result; a weighting factor updating section that updates a weighting factor applied to a score obtained from an acoustic model and a language model which are used in audio recognition so that the difference between a correct-answer score calculated with the use of a correct-answer text of the learning audio data and a score of the recognition result output from the audio recognition section becomes large; a convergence determination section that determines, with the use of the score after updating, whether to return to the weighting factor updating section to update the weighting factor again; and a weighting factor convergence determination section that determines, with the use of the score after updating, whether to return to the audio recognition section to perform the process again and update the weighting factor using the weighting factor updating section.

According to the present invention, a weighting factor learning method includes: an audio recognition step of recognizing learning audio data and outputting the recognition result; a weighting factor updating step of updating a weighting factor applied to a score obtained from an acoustic model and a language model which are used in audio recognition so that the difference between a correct-answer score calculated with the use of a correct-answer text of the learning audio data and a score of the recognition result output by the audio recognition step becomes large; a convergence determination step of determining, with the use of the score after updating, whether to return to the weighting factor updating step to update the weighting factor again; and a weighting factor convergence determination step of determining, with the use of the score after updating, whether to return to the audio recognition step to perform the process again and update the weighting factor in the weighting factor updating step.

According to the present invention, a weighting factor learning program causes a computer to execute: an audio recognition process of recognizing learning audio data and outputting the recognition result; a weighting factor updating process of updating a weighting factor applied to a score obtained from an acoustic model and a language model which are used in audio recognition so that the difference between a correct-answer score calculated with the use of a correct-answer text of the learning audio data and a score of the recognition result output by the audio recognition process becomes large; a convergence determination process of determining, with the use of the score after updating, whether to return to the weighting factor updating process to update the weighting factor again; and a weighting factor convergence determination process of determining, with the use of the score after updating, whether to return to the audio recognition process to perform the process again and update the weighting factor in the weighting factor updating process.

According to the present invention, an audio recognition system carries out audio recognition using a weighting factor updated by the above weighting factor learning system.

According to the present invention, an audio recognition method carries out audio recognition using a weighting factor updated by the above weighting factor learning method.

An audio recognition program causes a computer to perform an audio recognition process of carrying out audio recognition using a weighting factor updated by the above weighting factor learning program.

Advantageous Effects of Invention

According to the present invention, the weighting factor applied to the score calculated by the acoustic and language models for audio recognition can be automatically estimated at high speed without prior knowledge about a range. In addition, audio recognition can be carried out in a highly accurate manner with the use of the weighting factor.

REFERENCE SIGNS LIST

| | |
|---|---|
| 001: | Weighting factor learning section |
| 100: | Learning audio data |
| 101: | Audio recognition section |
| 102: | Acoustic/language models |
| 103: | Candidate narrowing section |
| 104: | Score calculation section |
| 105: | Score expectation value calculation section |
| 106: | Weighting factor updating section |
| 107: | Objective function calculation section |
| 108: | Convergence determination section |
| 109: | Weighting factor convergence determination section |
| 110: | Correct answer text |

DESCRIPTION OF EMBODIMENTS

The following describes in detail the best mode for carrying out a weighting factor learning system and an audio recognition system according to the present invention with reference to the accompanying diagrams.

First Exemplary Embodiment

Figure 1:
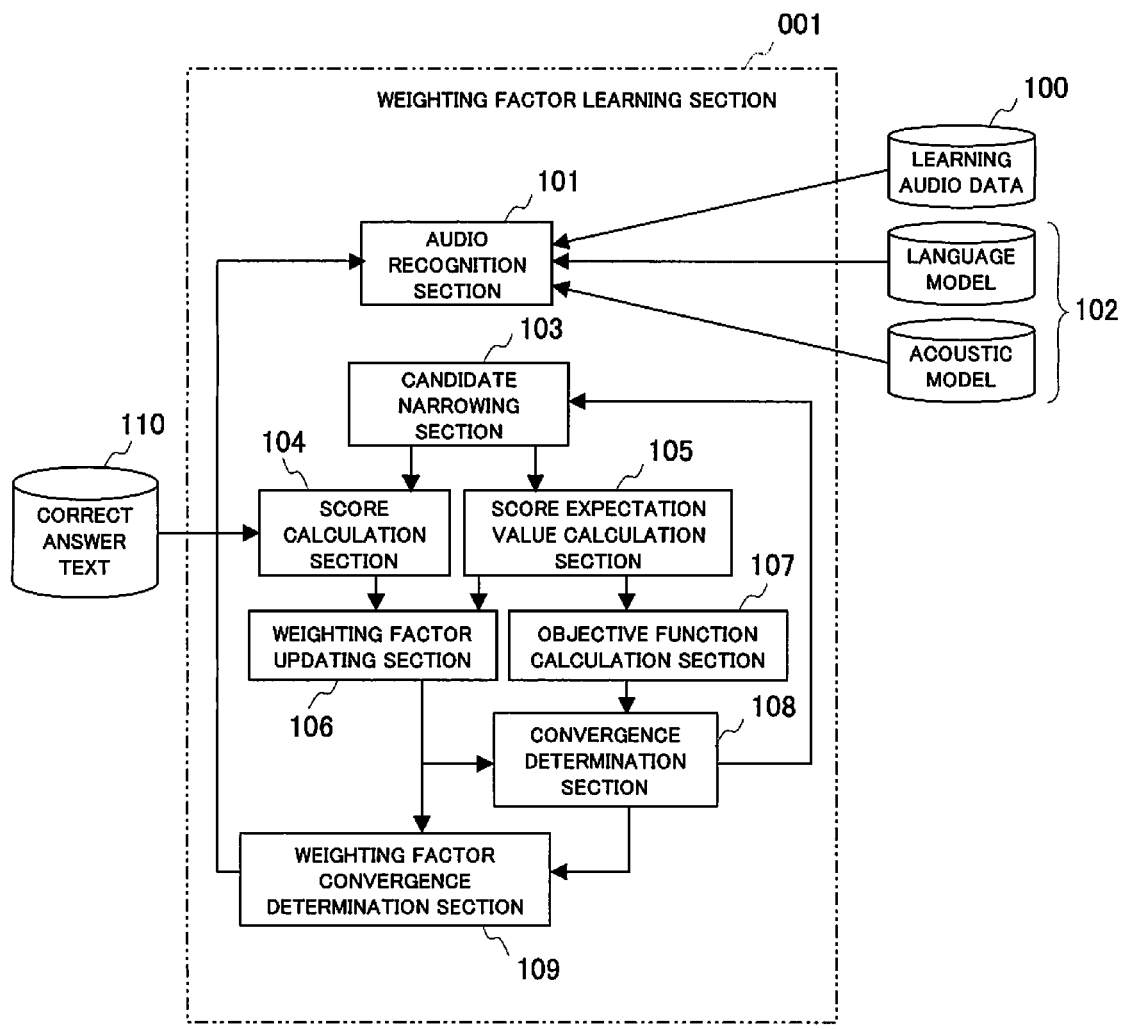
FIG. 1 is a block diagram illustrating the configuration of a weighting factor learning system according to a first exemplary embodiment of the present invention.

With reference to FIG. 1, elements constituting a weighting factor learning system of an acoustic score and a language score for audio recognition will be described.

With reference to FIG. 1, according to a first exemplary embodiment of the present invention, the weighting factor learning system includes for example a computer system. The weighting factor learning system includes a weighting factor learning section 001, learning audio data 100, acoustic/language models 102, and a correct answer text 110.

The weighting factor learning section 001 includes an audio recognition section 101, a candidate narrowing section 103, a score calculation section 104, a score expectation value calculation section 105, a weighting factor updating section 106, an objective function calculation section 107, a convergence determination section 108, and a weighting factor convergence determination section 109. Each section is realized by for example the process of software by a computer. In this case, the process of each section may be realized by an individual program or by a program which works in cooperation with other programs like OS (Operation System) as long as the function can be realized.

The learning audio data 100 are the audio data used to estimate the value of a weighting factor. The learning audio data 100 are for example obtained by A/D (Analog to Digital) conversion with a sampling frequency of 44.1 kHz and with 16 bits per sample. The learning audio data 100 is for example stored in a storage device such as a hard disc device or a memory which can be accessed by a computer constituting the system.

The correct answer text 110 is text data transcribed from the speech content of the learning audio 100. The correct answer text 110 is for example stored in a storage device such as a hard disc device or a memory which can be accessed by a computer constituting the system.

The acoustic/language models 102 include an acoustic model and a language model for audio recognition. The acoustic/language models 102 are for example stored in a storage device such as a hard disc device or a memory which can be accessed by a computer constituting the system.

Among the above models, the acoustic model is a probabilistic model representing the acoustic characteristics of speech sounds. For example, HMM (Hidden Marcov Model), described on pages 35 to 40 of Non-Patent Document 1, is widely used: The HMM has, as a phoneme, a triphone which takes into consideration the preceding and subsequent phoneme contexts.

The following explains the learning of the acoustic model.

First, as described on pages 54 to 64 of Non-Patent Document 1, the acoustic characteristics of speech sounds are extracted by taking a constant segment the size of which is about 10 msec from the audio data, and performing cosine conversion after carrying out the processes of pre-emphasis, FFT and filter bank. In addition to the amount of extracted characteristics, power and the difference in time between the preceding and the subsequent may be used. With the use of the extracted characteristics and label data obtained by the corresponding transcribed text, a forward/backward probability described on pages 127 to 130 of Non-Patent Document 1 is calculated to associate the characteristics with the label data.

Here, the label data may be the above-described triphone. For example, if the transcription result is "Watakushi," the label data are "*−w+a w−a+t a−t+a t−a+k a−k+u k−u+s u−s+i s−i+*." With the use of the amount of characteristics and the label data which are associated with one another, parameters of the distribution function for each segment, which is based on a phoneme or a more specific state unit, are calculated. The normal distribution is often used as the distribution function but is the average of the amount of parameter characteristics and variance in this case.

As described on pages 57 to 62 of Non-Patent Document 3, the language model is represented by the approximation of N-gram, and the learning method is primarily conducted by maximum likelihood estimation. N-gram is a method for the modeling of a language model: the appearance probability of every word is approximated with the use of the appearance probability (conditional probability) of an Nth word with an N−1 word in a history as a condition. According to the maximum likelihood estimation, the appearance probability can be calculated by counting the frequency of a word sequence in the learning corpus. For example, with P(Wa|Watashi) representing the probability of "Wa" appearing after "Whatashi" and P(Watashi, Wa) representing the simultaneous probability of "Watashi" and "Wa" appearing simultaneously, P(Wa|Watashi) can be calculated with the use of P(Watashi) representing the probability of "Watashi" appearing: P(Wa|Watashi)=P(Watashi, Wa)/P(Watashi).

The audio recognition section 101 uses the learning audio 100, the acoustic model and the language model, regards the logarithm of the above-mentioned forward/backward probability as an acoustic score and the logarithm of N-gram as a language score, and outputs the acoustic and language scores the sum of which is largest as recognition candidates. The word graph, described on pages 334 to 338 of Non-Patent Document 1, is often used as the output format.

Figure 2:
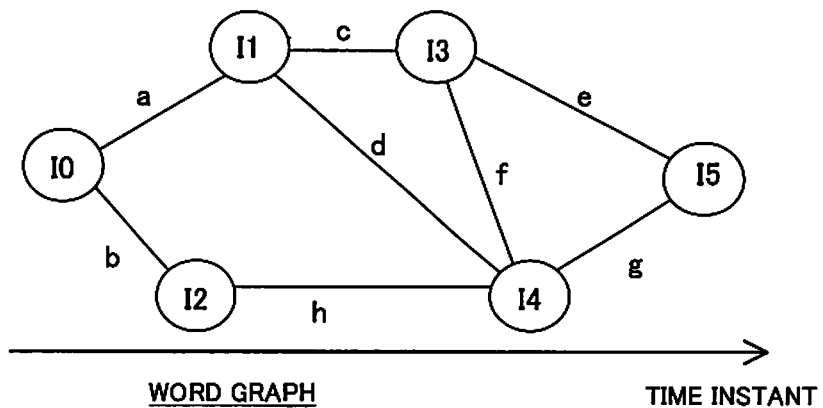
FIG. 2 is a diagram illustrating a word graph output as the recognition result of the audio recognition section.

With reference to FIG. 2, the word graph will be described.

In the left diagram of FIGS. 2, 11 to 15 represent points that define a starting time instant and an end time instant of a word. A node representing the starting time instant is referred to as a starting node. A node representing the end time instant is referred to as an end node. In the left diagram of FIG. 2, the word is expressed as a, b, c, d, e, f, and g, and shown in the diagram as a solid line connecting the starting node, which is the beginning time instant of the word, to the end node, which is the end time instant of the word. The solid line is called a word arc. The time instants representing the starting and end nodes represent the time instants when the word appears as a recognition candidate. The word graph is the result of spelling out the one shown in the left diagram of FIG. 2 as shown in the right diagram, and the word arc is drawn using each of the starting and end nodes (I1 to I5). Information about words and acoustic likelihood is described for each drawn word arc.

The candidate narrowing section 103 selects M recognition candidates in descending order of score using the word graph which is the recognition result output by the audio recognition section 101, and outputs information about each recognition candidate's acoustic and language scores and the number of words. A* search (A-star search) is for example used as the selection method.

Here, with reference to FIGS. 2 and 3, the operation of A* search by the candidate narrowing section 103 will be described.

In the case of A* search, a section is prepared to store word information called stack. Here, the word information represents words (a to h) on the word graph, the path information thereof, and a path score. The path information is for example information representing a path passing through the words e→c→a when the path is tracked from a word connected to the 15 node that is the end point of the word graph, which is for example e, to the beginning.

In the case of the present example, the path score is the sum of the acoustic and language scores. The path score is the sum of a forward score and a backward score. The forward score is the result of adding the language scores and the acoustic scores until a certain word is reached from the starting point. The backward score is the result of adding the language scores and the acoustic scores until a certain word score is reached from the end point. For example, when the path score for the word a is calculated, the forward score is 0, and the backward score is defined as the sum of the acoustic and language scores on one of the three paths: a path of the words e and c, a path of the words g, f and c, and a path of the words g and d.

Figure 3:
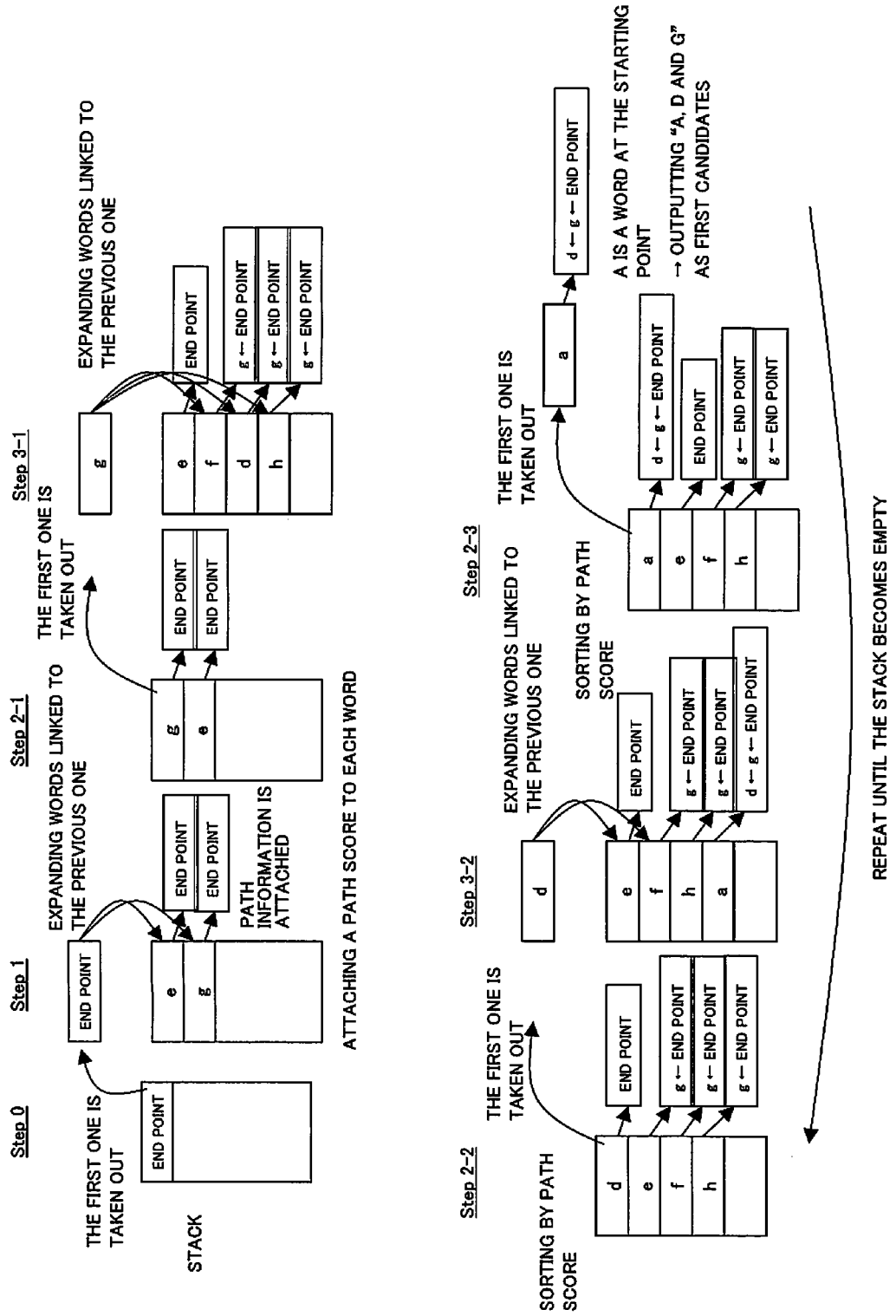
FIG. 3 is a diagram illustrating A* search which is an algorithm whereby a candidate narrowing section pins down a candidate from a word graph.

The following describes in detail the operation of A* search with reference to FIG. 3.

In FIG. 3, at Step 0, as an initial state, a tentative end point (end point) which does not particularly make sense as a word is put on the stack. Assume that the end point is linked to the words e and g in FIG. 2.

Then, at Step 1, the first one is taken out from the stack, and the stack becomes empty for a moment. The next operation is to put the words e and g linked to the end point on the stack. At this time, the path information according to which each word is connected from the end point, and the path score are attached.

Then, at Step 2-1, the stack is sorted by path score. In the case of the diagram, the first one is g.

Subsequently, at Step 3-1, the first word g is taken out from the stack, and the only one left in the stack for a moment is the word arc e. The words f, d and h linked to the word arc g are put on the stack. At this time, the path information representing the arrival from the end point via g, like "g←end point," is attached as the path information about f, d and h. In addition, the path score is attached.

Then, at Step 2-2 and Step 3-2, the processes described above are repeated. If there is not a new word before the word at the first place after the process of Step 2-3 is complete (like the word a), the words g, d and a which have been represented by words as the first candidates are output as the recognition result.

Then, the processes of Step 2-n and Step 3-n (n: an integral number) are repeated. If the word arc at the first place of the stack is not linked to anything, a word sequence is output as the recognition result. Therefore, the word sequence that is the Mth candidate can be output as the recognition result.

Using the learning audio data 100 and the correct answer text 110, the score calculation section 104 calculates the following element in the equation (2) described later:

$$\sum_i f_k(w_i, o_i) \quad \text{[Math. 2]}$$

Here, the case of k=1 means the acoustic score, the case of k=2 means the language score, $o_i$ represents the i-th learning audio data item, and $w_i$ represents a word sequence corresponding to the i-th learning audio data item. Here, the acoustic score to be calculated is the logarithm of the above-mentioned forward/backward probability which can be obtained with the use of an individual learning audio data item and the corresponding word sequence set $o_i$ and $w_i$. Similarly, the language score is the logarithm of the N-gram probability of the word sequence.

The score expectation value calculation section 105 calculates the following element using the recognition candidates which the candidate narrowing section 103 has narrowed the candidates down to, the acoustic score and the language score:

$$\sum_i \sum_w p(w|o) f_k(w_i, o_i) \quad \text{[Math. 3]}$$

Here, $p(w|o_i)$ represents the posterior probability of the learning audio data item $o_i$ and an arbitrary word sequence w, and can be calculated by the equation (1). By the way, for the denominator of the equation (1), all the combinations of the word sequence w need to be calculated. However, the calculation of the score expectation value calculation section 105 uses only the M candidates selected by the candidate narrowing section 103.

For the score obtained from the acoustic model and the language model, the weighting factor updating section 106 updates the weighting factor applied to the score so that the difference between the correct-answer score calculated with the use of the correct answer text 110 of the learning audio data 100 and the recognition-result score output from the audio recognition section 101 becomes large. Specifically, using the equation (2) described below, the weighting factor of the score of each model is updated.

Equation (2)

$$\lambda_k \leftarrow \lambda_k + \eta \sum_i \left\{ f_k(w_i, o_i) - \sum_w p(w|o) f_k(w_i, o_i) \right\} \quad \text{[Math. 4]}$$

Here, the following is an element in the equation (2):

$$\sum_i f_k(w_i, o_i) \quad \text{[Math. 5]}$$

The element in the equation (2) is a value calculated by the score calculation section 104.

The following is a value calculated by the score expectation value calculation section 105:

$$\sum_i \sum_w p(w|o) f_k(w_i, o_i) \quad \text{[Math. 6]}$$

where η is a value which is preset appropriately. For example, η is preset around 0.1.

Among the posterior probabilities p(w|o) calculated by the score expectation value calculation section 105, the objective function calculation section 107 adds up the posterior probabilities p(w|o) which correspond to the word sequence w corresponding to the learning audio data item o.

For the posterior probabilities added up by the objective function calculation section 107, the convergence determination section 108 determines to end updating if the amount of change from the value calculated last time at the time of updating is less than or equal to a certain constant threshold. On the other hand, if the amount of change is larger than the threshold, the convergence determination section 108 returns to the candidate selection section 103 again to continue the processes. In this case, the amount of change is the result of dividing the previous difference by the latest value.

The weighting factor convergence determination section 109 determines to end if the difference ratio of the value of the weighting factor updated by the weighting factor updating section 106 to the value obtained last time at the time of updating is less than or equal to a threshold. Moreover, if the ratio is greater than the threshold, the weighting factor convergence determination section 109 determines to return to the audio recognition section 101 again to repeat the processes.

Figure 4:
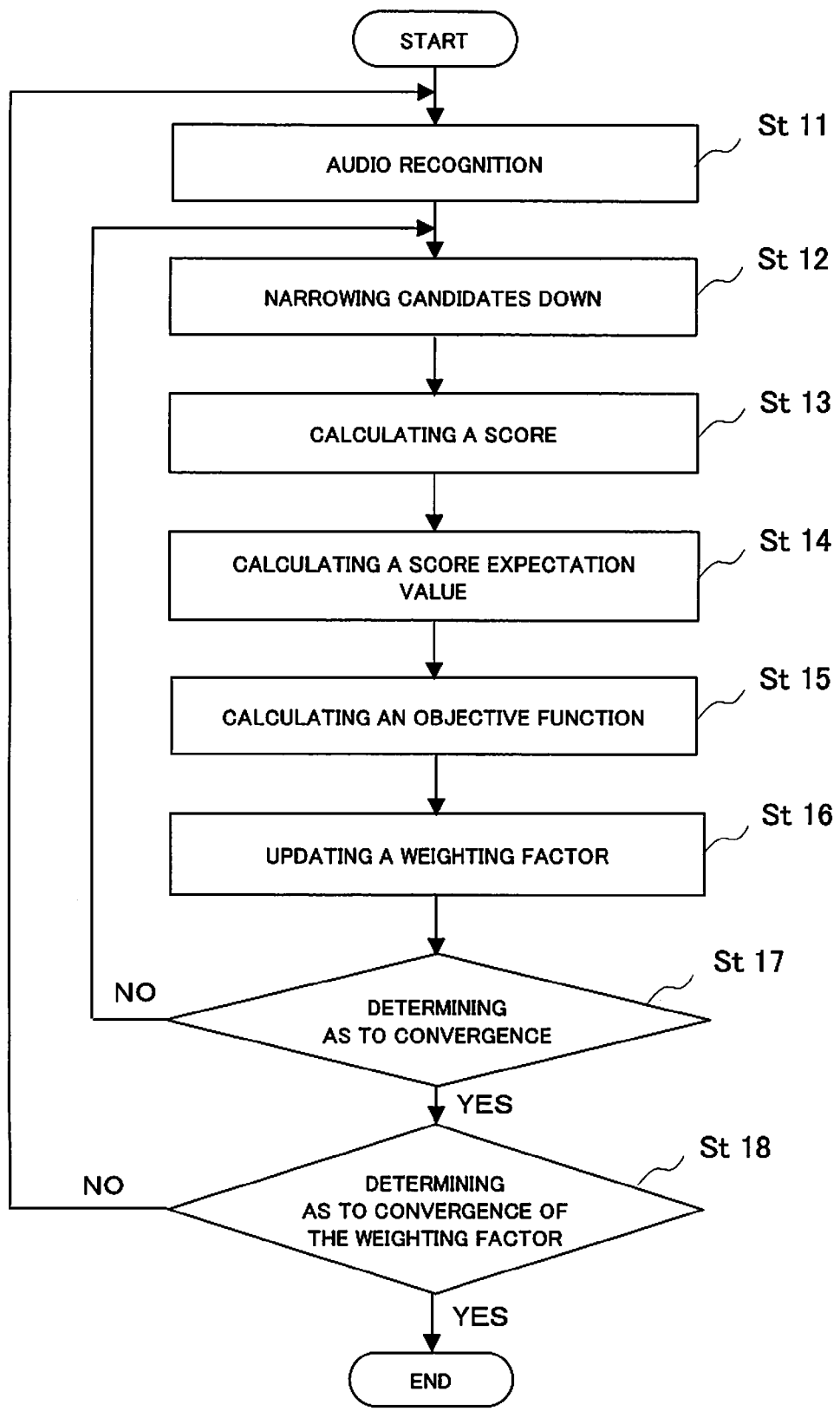
FIG. 4 is a flowchart illustrating the operation of the weighting factor learning system according to the first exemplary embodiment of the present invention.

With reference to FIG. 4, the following describes the operation of the weighting factor learning section 001 according to the present exemplary embodiment.

First, the process of the audio recognition section 101 is performed (step St11). In the process, the recognition of the learning audio data 100 is carried out with the use of the acoustic/language models 102. In this case, as initial values, arbitrary values are used as the weighting factor $\lambda_1$ of the acoustic model and the weighting factor $\lambda_2$ of the language model: Both the weighting factors $\lambda_1$ and $\lambda_2$ are 1 because it is assumed that the situation is ideal. After recognition, the recognition result is output as the word graph in the format shown in FIG. 2.

Then, the process of the candidate narrowing section 103 is performed (step St12). In the process, A* search is used to search the word graph, and the M word-sequence candidates, and the accompanying acoustic and language scores are output.

Subsequently, the process of the score calculation section 104 is performed (step St13). In the process, with the use of the learning audio data 100 and the correct answer text 110, the following element in the equation (2) is calculated:

$$\sum_i f_k(w_i, o_i) \quad \text{[Math. 7]}$$

The calculation process is performed for all the items of learning audio data 100.

Then, the process of the score expectation value calculation section 105 is performed (step St14). In the process, the following element is calculated with the use of the M word-sequence candidates, the acoustic score and the language score:

$$\sum_i \sum_w p(w \mid o) f_k(w_i, o_i) \quad \text{[Math. 8]}$$

The calculation process is performed for all the items of learning audio data 100. That is, the number of times the calculation process is performed is represented as follows: the number of the learning audio data items×M.

Subsequently, the process of the weighting factor updating section 106 is performed (step St15). In the process, with $\eta=0.1$, the following element calculated by the score calculation section 104 is used:

$$\sum_i f_k(w_i, o_i) \quad \text{[Math. 9]}$$

Also used is the following element calculated by the score expectation value calculation section 105:

$$\sum_i \sum_w p(w \mid o) f_k(w_i, o_i) \quad \text{[Math. 10]}$$

Both elements are applied to the equation (2) to update the weighting factor $\lambda_k$.

Then, the process of objective function calculation section 107 is performed (step St16). In the process, with the user of the equation (1), the word-sequence candidate and the correct answer text 110, the posterior probability of each learning audio data item is calculated and added up.

Subsequently, the process of the convergence determination section 108 is performed (step St17). In the process, as for the posterior probabilities added up, a determination is made as to whether the rate of change is less than or equal to a certain constant threshold, which is for example $1.0^{-4}$. If the result is that the rate is greater than the threshold (NO), the process of the candidate narrowing section 103 (step St12) is retried. In this case, the candidate narrowing section 103 uses the value of the weighting factor updated by the weighting factor updating section 106 to narrow the candidates down. On the other hand, if the rate is less than or equal to the threshold (YES), the candidate narrowing section 103 determines that the rate of change has converged and then proceeds to the process of the subsequent weighting factor convergence determination section 109.

Then, the process of the weighting factor convergence determination section 109 is performed (step St18). In the process, a determination is made as to whether the rate of change of the updated weighting factor is less than or equal to a certain constant threshold. If the result is that the rate is greater than the threshold (NO), the process of the audio recognition section 101 is retried (step St1). In this case, the audio recognition section 101 updates the value of the weighting factor and performs the recognition process again. On the other hand, if the rate is less than or equal to the threshold (YES), the weighting factor convergence determination section 109 determines to end the process because the rate of change has converged.

Therefore, according to the present exemplary embodiment, as for the adjustment of the weighting factor applied to the score calculated from the acoustic model, the language model or the like, provided is a weighting factor learning system that can automatically and appropriately adjust the values.

That is, according to the present exemplary embodiment, as for the calculation of the weighting factor of the score calculated by each model, an appropriate value can be estimated even when estimation starts with an arbitrary initial value. Therefore, it is possible to carry out audio recognition in a highly accurate manner by using the values of the weighting factors.

The reason is the following: the denominator needs to be calculated accurately in order to maximize the equation (1); instead of calculating all combinations of output sequences like words, selection is automatically carried out on the combinations, and an appropriate value is calculated with the selected combinations. Therefore, the value (referred to as a quasi-appropriate value) of the weighting factor which is more appropriate than the initial value is estimated. Moreover, with the use of the quasi-appropriate value, the recognition process and the like are performed to carry out selection again on the candidates. In this manner, a more suitable selection for estimation is carried out. With the selected candidates, an appropriate value is estimated again. Therefore, the estimated value is expected to be more appropriate than the previous quasi-appropriate value.

Incidentally, according to the above-mentioned exemplary embodiment, the following value is calculated by the score expectation value calculation section 105:

$$\sum_i \sum_w p(w \mid o) f_k(w_i, o_i) \quad \text{[Math. 11]}$$

As a method for calculating the value, the method of calculating the value with the use of the M candidates selected by the candidate narrowing section 103 has been described above. However, as another example, the value can be directly calculated from the word graph with the use of the forward/backward algorithm described in Non-Patent Document 4.

Second Exemplary Embodiment

The following describes a second exemplary embodiment of the present invention. The present exemplary embodiment is applied to an audio recognition system that uses the weighting factor learning system of the acoustic and language scores of the first exemplary embodiment.

Figure 5:
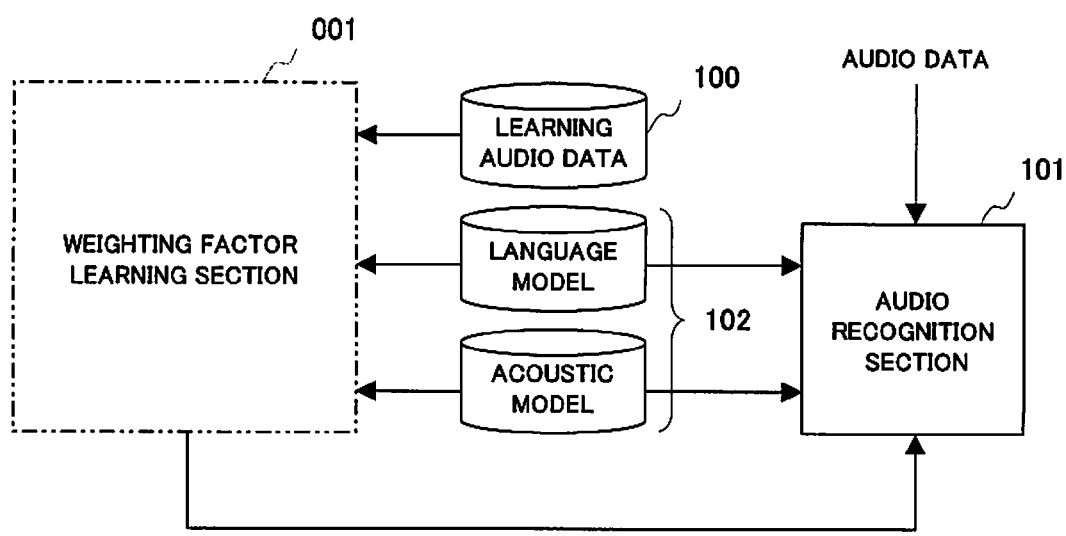
FIG. 5 is a block diagram illustrating the configuration of an audio recognition system according to a second exemplary embodiment of the present invention.

With reference to FIG. 5, according to the present exemplary embodiment, the audio recognition system includes the weighting factor learning section 001, the learning audio data 100, the acoustic/language models 102, and the audio recognition section 101. The configuration of each component is the same as in the first exemplary embodiment (The configuration of the audio recognition section 101 is the same as that of the audio recognition section 101 in the weighting factor learning section 001).

The following describes the operation of the present exemplary embodiment.

Moreover, as described above, the weighting factors $\lambda_1$ and $\lambda_2$ applied to the acoustic and language scores are estimated by the weighting factor learning section 001 with the use of the learning audio data 100 and the acoustic/language models 102.

Then, the recognition-target audio data which are different from the learning audio data 100 are recognized by the audio recognition section 101 with the use of the acoustic/language models 102. At the time of recognition, the acoustic and language scores, which are similar to those described above, are calculated. However, the values $\lambda_1$ and $\lambda_2$ estimated by the weighting factor learning section 001 are used as the weighting factors to be applied to the acoustic and language scores.

Therefore, according to the present exemplary embodiment, as for the adjustment of the weighting factor applied to the score calculated from the acoustic model, the language model or the like, a weighting factor learning system that can automatically and appropriately adjust the values is used. Therefore, provided is the highly accurate audio recognition system that uses the adjusted weighting factor.

Other Examples

The exemplary embodiments of the present invention have been described above in detail. However, the present invention is not limited to the above exemplary embodiments which have been described as representative examples. Based on the content of the appended claims, those skilled in the art can carry out various modifications and alterations insofar as they are within the scope of the present invention. In addition, those altered and modified are within the scope of the right of the present invention.

For example, in the above-noted exemplary embodiments, the estimation of the weighting factors of the acoustic and language models have been described. However, the number of models may not be two. A similar process may be carried out on a plurality of acoustic models and a plurality of language models to estimate the weighting factors which are applied to scores obtained from each model. In this case, k of the equations (1) and (2) increases in accordance with the number of models. Moreover, the same holds not only for the acoustic and language scores but for other cases: Even if an arbitrary score is introduced, application is possible after the weighting factor applied to the arbitrary score is set.

M may be a predetermined constant value when the candidate narrowing section 103 determines the M recognition candidates. Moreover, similarly, when the M recognition candidates are determined, only a candidate whose acoustic or language score or sum of the acoustic and language scores is greater than a threshold may be selected. Furthermore, when the M recognition candidates are determined, a candidate whose difference from or ratio to the first candidate in the acoustic or language score or the sum of the acoustic and language scores is greater than or equal to a threshold may be selected.

Instead of calculating the expectation value using the M candidates, the score expectation value calculation section 105 may calculate the expectation value using the word graph.

The convergence determination section 108 may return to the weighting factor updating section 106 to perform the process when the difference between the score before the updating of the weighting factor and the score after the updating of the weighting factor, and the rate of change in a value obtained by dividing the difference by the score before the updating of the weighting factor are greater than predetermined thresholds.

Moreover, the convergence determination section 108 may make a determination as to convergence using not only the value obtained by adding up the posterior probabilities but also the value of the weighting factor updated by the weighting factor updating section 108.

For example, the convergence determination section 108 may return to the weighting factor updating section 106 to perform the process when the difference between the weighting factor which is not updated and the weighting factor which has been updated, and the rate of change in a value obtained by dividing the difference by the weighting factor which is not updated are greater than predetermined thresholds.

The weighting factor convergence determination section 109 may return to the audio recognition section 101 to perform the process when the difference between the weighting factor which is not updated and the weighting factor which has been updated, and the rate of change in a value obtained by dividing the difference by the weighting factor which is not updated are greater than predetermined thresholds.

Moreover, the weighting factor convergence determination section 109 may make a determination as to convergence using not only the value of the weighting factor but also the value that the objective function calculation section 107 has calculated by adding up the posterior probabilities.

For example, the weighting factor convergence determination section 109 may return to the audio recognition section 101 to perform the process when the difference between the score before the updating of the weighting factor and the score after the updating of the weighting factor, and the rate of change in a value obtained by dividing the difference by the score before the updating of the weighting factor are greater than predetermined thresholds.

Moreover, the hardware and software configuration of the above weighting factor learning system and audio recognition system is not limited to a specific one. As long as the function of each section described above can be realized, any configuration is applicable. For example, a circuit may be independently provided for the function of each section, or a plurality of functions may be put together into one circuit. Alternatively, all the functions may be realized primarily by software processes.

Moreover, if a program code is used to realize at least part of the function of each section constituting the above-mentioned weighting factor learning system and audio recognition system, the program code and a storage medium on which the program code is recorded is within the scope of the present invention. In this case, if the above-mentioned functions are realized in cooperation with other software programs such as OS (Operating System) and application software programs, the program codes of the software programs are also within the scope of the present invention. The storage medium includes a memory such as ROM (Read Only Memory) disposed inside a computer; a hard disc; a disc recording medium such as CD-ROM (Compact Disk Read Only Memory) and DVD-ROM (Digital Versatile Disk Read Only Memory); a tape recording medium such as a magnetic tape; and a portable recording medium such as a portable IC (Integrated Circuit) memory. Moreover, according to another exemplary embodiment, a program code which is stored in a recording medium of another computer device such as a server may be downloaded via a communication network like the Internet.

This application is the National Phase of PCT/JP2008/052721, filed on Feb. 19, 2008, which is based upon and claims the benefit of priority from Japanese patent application No. 2007-049975, filed on Feb. 28, 2007, the disclosure of which is incorporated herein its entirety by reference.

INDUSTRIAL APPLICABILITY

The present invention can be applied to an audio recognition device that carries out audio recognition, and a program that can realize the audio recognition device using a computer.

The invention claimed is:

1. A weighting factor learning system comprising:
an audio recognition section that recognizes learning audio data and outputs a recognition result;
a weighting factor updating section that updates a first weighting factor applied to an acoustic score obtained from an acoustic model and a second weighting factor applied to a language score obtained from a language model which are used in the audio recognition so that a difference between a correct-answer score calculated with the use of a correct-answer text of the learning audio data and a recognition-result score output from the audio recognition section becomes large;
a convergence determination section that determines, with the use of the acoustic score after updating the first weighting factor and the language score after updating the second weighting factor, whether to return to the weighting factor updating section to update the first weighting factor and the second weighting factor again; and
a weighting factor convergence determination section that determines, with the use of the acoustic score after updating the first weighting factor and the language score after updating the second weighting factor, whether to return to the audio recognition section to
recognize the learning audio data and to output the recognition result using the audio recognition section,
update the first weighting factor and the second weighting factor using the weighting factor updating section, and
determine whether to return to the weighting factor updating section using the convergence determination section to update the first weighting factor and the second weighting factor again.

2. The weighting factor learning system according to claim 1, wherein the recognition result is a word graph.

3. The weighting factor learning system according to claim 1, wherein
as the recognition result word sequences are selected and used among recognition candidate word sequences in descending order of a sum of the acoustic score and the language score, a number of the selected word sequences is determined in advance.

4. The weighting factor learning system according to claim 1, wherein
the recognition result comprises word sequences and an acoustic score, a language score and a sum of the acoustic score and the language score of the word sequences are greater than predetermined thresholds.

5. The weighting factor learning system according to claim 1, wherein
the recognition result is a word sequence whose differences from the largest score in the acoustic score, the language score and the sum of the acoustic and language scores are less than predetermined thresholds.

6. The weighting factor learning system according to claim 1, wherein
the convergence determination section returns to the weighting factor updating section to
update the first weighting factor and the second weighting factor using the weighting factor updating section, and
determine whether to return to the weighting factor updating section using the convergence determination section to update the first weighting factor and the second weighting factor again
when a score difference before the updating and after the updating, and a rate of change obtained by dividing the score difference are greater than predetermined thresholds, wherein the score difference is based on the acoustic score and the language score.

7. The weighting factor learning system according to claim 1, wherein
the convergence determination section returns to the weighting factor updating section to
update the first weighting factor and the second weighting factor using the weighting factor updating section, and
determine whether to return to the weighting factor updating section using the convergence determination section to update the first weighting factor and the second weighting factor again
when a score difference before the updating and after the updating, and a rate of change obtained by dividing the score difference are greater than predetermined thresholds, wherein the score difference is based on the acoustic score and the language score.

8. The weighting factor learning system according to claim 1, wherein
the weighting factor convergence determination section returns to the audio recognition section to
recognize the learning audio data and to output the recognition result using the audio recognition section,
update the first weighting factor and the second weighting factor using the weighting factor updating section, and
determine whether to return to the weighting factor updating section using the convergence determination section to update the first weighting factor and the second weighting factor again
when a score difference before the updating and after the updating, and a rate of change obtained by dividing the score difference are greater than predetermined thresholds, wherein the score difference is based on the acoustic score and the language score.

9. The weighting factor learning system according to claim 1, wherein
the weighting factor convergence determination section returns to the audio recognition section to
recognize the learning audio data and to output the recognition result using the audio recognition section,
update the first weighting factor and the second weighting factor using the weighting factor updating section, and
determine whether to return to the weighting factor updating section using the convergence determination section to update the first weighting factor and the second weighting factor again
when a score difference before the updating and after the updating, and a rate of change obtained by dividing the score difference are greater than predetermined thresholds, wherein the score difference is based on the acoustic score and the language score.

10. A weighting factor learning method comprising:
an audio recognition operation of recognizing learning audio data and outputting a recognition result;
a weighting factor updating operation of updating a first weighting factor applied to an acoustic score obtained from an acoustic model and a second weighting factor applied to a language score obtained from a language model which are used in the audio recognition so that a difference between a correct-answer score calculated with the use of a correct-answer text of the learning audio data and a recognition-result score output by the audio recognition operation becomes large;
a convergence determination operation of determining, with the use of the acoustic score after updating the first weighting factor and the language score after updating the second weighting factor, whether to return to the weighting factor updating operation to update the first weighting factor and the second weighting factor again; and
a weighting factor convergence determination operation of determining, with the use of the acoustic score after updating the first weighting factor and the language score after updating the second weighting factor, whether to return to the audio recognition operation to
recognize the learning audio data and to output the recognition result using the audio recognition operation,
update the first weighting factor and the second weighting factor in the weighting factor updating operation, and
determine whether to return to the weighting factor updating operation using the convergence determination operation to update the first weighting factor and the second weighting factor again.

11. The weighting factor learning method according to claim 10, wherein
the recognition result is a word graph.

12. The weighting factor learning method according to claim 10, wherein
as the recognition result word sequences are selected and used among recognition candidate word sequences in descending order of a sum of the acoustic score and the language score, a number of the selected words sequences is determined in advance.

13. The weighting factor learning method according to claim 10, wherein
the recognition result comprises word sequences and an acoustic score, a language score and a sum of the acoustic score and the language score of the word sequences are greater than predetermined thresholds.

14. The weighting factor learning method according to claim 10, wherein
the recognition result is a word sequence whose differences from the largest score in the acoustic score, the language score and the sum of the acoustic and language scores are less than predetermined thresholds.

15. The weighting factor learning method according to claim 10, wherein
the convergence determination operation returns to the weighting factor updating operation to
update the first weighting factor and the second weighting factor using the weighting factor updating operation, and
determine whether to return to the weighting factor updating section using the convergence determination operation to update the first weighting factor and the second weighting factor again
when a score difference before the updating and after the updating, and a rate of change obtained by dividing the score difference are greater than predetermined thresholds, wherein the score difference is based on the acoustic score and the language score.

16. The weighting factor learning method according to claim 10, wherein
the convergence determination operation returns to the weighting factor updating operation to
update the first weighting factor and the second weighting factor using the weighting factor updating section, and
determine whether to return to the weighting factor updating section using the convergence determination section to update the first weighting factor and the second weighting factor again
when a score difference before the updating and after the updating, and a rate of change obtained by dividing the score difference are greater than predetermined thresholds, wherein the score difference is based on the acoustic score and language score.

17. The weighting factor learning method according to claim 10, wherein
the weighting factor convergence determination operation returns to the audio recognition operation to
recognize the learning audio data and to output the recognition result using the audio recognition section,
update the first weighting factor and the second weighting factor using the weighting factor updating section, and
determine whether to return to the weighting factor updating section using the convergence determination section to update the first weighting factor and the second weighting factor again
when a score difference before the updating and after the updating, and a rate of change obtained by dividing the score difference are greater than predetermined thresholds, wherein the score difference is based on the acoustic score and language score.

18. The weighting factor learning method according to claim 10, wherein
the weighting factor convergence determination operation returns to the audio recognition operation to
recognize the learning audio data and to output the recognition result using the audio recognition section,
update the first weighting factor and the second weighting factor using the weighting factor updating section, and
determine whether to return to the weighting factor updating section using the convergence determination section to update the first weighting factor and the second weighting factor again when a score difference before the updating and after the updating, and a rate of change obtained by dividing the score difference are greater than predetermined thresholds, wherein the score difference is based on the acoustic score and language score.

19. A non-transitory computer-readable medium on which a weighting factor learning program is stored that causes a computer to execute:

an audio recognition process of recognizing learning audio data and outputting a recognition result;

a weighting factor updating process of updating a first weighting factor applied to an acoustic score obtained from an acoustic model and a second weighting factor applied to a language score obtained from a language model which are used in the audio recognition so that a the difference between a correct-answer score calculated with the use of a correct-answer text of the learning audio data and a recognition-result score output by the audio recognition process becomes large;

a convergence determination process of determining, with the use of the acoustic score after updating the first weighting factor and the language score after updating the second weighting factor, whether to return to the weighting factor updating process to update the first weighting factor and the second weighting factor again; and a weighting factor convergence determination process of determining, with the use of the acoustic score after updating the first weighting factor and the language score after updating the second weighting factor, whether to return to the audio recognition process to recognize the learning audio data and to output the recognition result using the audio recognition operation, update the first weighting factor and the second weighting factor in the weighting factor updating operation, and determine whether to return to the weighting factor updating operation using the convergence determination operation to update the first weighting factor and the second weighting factor again.

20. An audio recognition system that carries out audio recognition comprises a weighting factor learning system claimed in claim 1 for updating an acoustic model weighting factor and the language model weighting factor used in the audio recognition system.

21. An audio recognition method that carries out audio recognition comprising a weighting factor learning methods claimed in claim 10 for updating an acoustic model weighting factor and the language model weighting factor used in the audio recognition method.

* * * * *